(12) United States Patent
Yoshida (10) Patent No.: US 12,267,563 B2
(45) Date of Patent: Apr. 1, 2025

(54) DISPLAY DEVICE, DISPLAY CONTROL METHOD, AND NON-TRANSITORY RECORDING MEDIUM

(71) Applicant: SHARP KABUSHIKI KAISHA, Sakai (JP)

(72) Inventor: Yuichi Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/201,775

(22) Filed: May 25, 2023

(65) Prior Publication Data

US 2023/0388606 A1 Nov. 30, 2023

(30) Foreign Application Priority Data

May 27, 2022 (JP) ................. 2022-086467

(51) Int. Cl.
*H04N 21/485* (2011.01)
*H04N 21/84* (2011.01)
*H04N 21/845* (2011.01)

(52) U.S. Cl.
CPC ......... *H04N 21/4854* (2013.01); *H04N 21/84* (2013.01); *H04N 21/845* (2013.01)

(58) Field of Classification Search
CPC ... H04N 21/4854; H04N 21/84; H04N 21/845
See application file for complete search history.

(56) References Cited

U.S. PATENT DOCUMENTS

| | | | |
|---|---|---|---|
| 2008/0231581 A1* | 9/2008 | Fujine .................. | G09G 3/3406 345/98 |
| 2011/0058105 A1* | 3/2011 | Nagashima ........ | H04N 21/4318 348/602 |
| 2011/0269443 A1* | 11/2011 | Farnsworth ........... | H04W 48/16 455/418 |

FOREIGN PATENT DOCUMENTS

JP 2001111916 A 4/2001

* cited by examiner

*Primary Examiner* — Joshua D Taylor
(74) *Attorney, Agent, or Firm* — ScienBiziP, P.C.

(57) ABSTRACT

A display device includes a receiver that receives at least video data and genre information, an acquirer that acquires image quality information corresponding to the genre information, a genre detector that detects a change in the genre information, and a controller that performs, when a change in the genre information is detected, control such that image quality of the video data is set based on image quality information corresponding to the changed genre information when a predetermined period of time has elapsed after a time point when the genre information is changed.

8 Claims, 8 Drawing Sheets

| GENRE | IMAGE QUALITY PARAMETERS |
|---|---|
| SPORTS | BRIGHTNESS =A1, SATURATION =B1, HUE =C1, ... |
| NEWS | BRIGHTNESS =A2, SATURATION =B2, HUE =C2, ... |
| DRAMA | BRIGHTNESS =A3, SATURATION =B3, HUE =C3, ... |
| ... | ... |

FIG. 3A

GENRE CHANGE DETECTION AND
CHANGE IN IMAGE QUALITY SETTING

FIG. 3B

GENRE CHANGE   CHANGE IN IMAGE
DETECTION      QUALITY SETTING

DISPLAY DEVICE, DISPLAY CONTROL METHOD, AND NON-TRANSITORY RECORDING MEDIUM

BACKGROUND OF THE INVENTION

Field of the Invention

The present disclosure relates to a display device, a display control method, and a recording medium.

Description of the Background Art

A technique of detecting a genre of a program being displayed on a television receiver and causing the television receiver to perform a type of brightness processing memorized in association with the detected genre is known.

In general, in multiplexed broadcast waves, video data and genre information of a program are not synchronized with each other. Furthermore, when a program is switched, the genre information is transmitted before a time point at which the program is switched. Therefore, before the video data of the program is switched, the television receiver detects the switching of the genre information.

When the television receiver performs image processing with an image quality setting (such as a brightness setting) based on genre information of a program after switching at a time when the switching of the genre information is detected, appropriate image processing is not performed. In other words, even though video data obtained before the program is switched is displayed by the television receiver, the image processing is performed on video data with an image quality setting for a next program. In this case, image quality of the displayed image is degraded because the image processing with an appropriate image quality setting is not performed. The general techniques do not solve such a problem.

As one aspect, an object of the present disclosure is to provide a display device or the like that is capable of suppressing degradation of image quality when performing image processing based on genre information.

SUMMARY OF THE INVENTION

According to an aspect or the present disclosure, a display device includes a receiver that receives at least video data and genre information, an acquirer that acquires image quality information corresponding to the genre information, a genre detector that detects a change in the genre information, and a controller that performs, when a change in the genre information is detected, control such that image quality of the video data is set based on image quality information corresponding to the changed genre information when a predetermined period of time has elapsed after a time point when the genre information is changed.

DESCRIPTION OF THE PREFERRED EMBODIMENTS

First Embodiment

Figure 1:
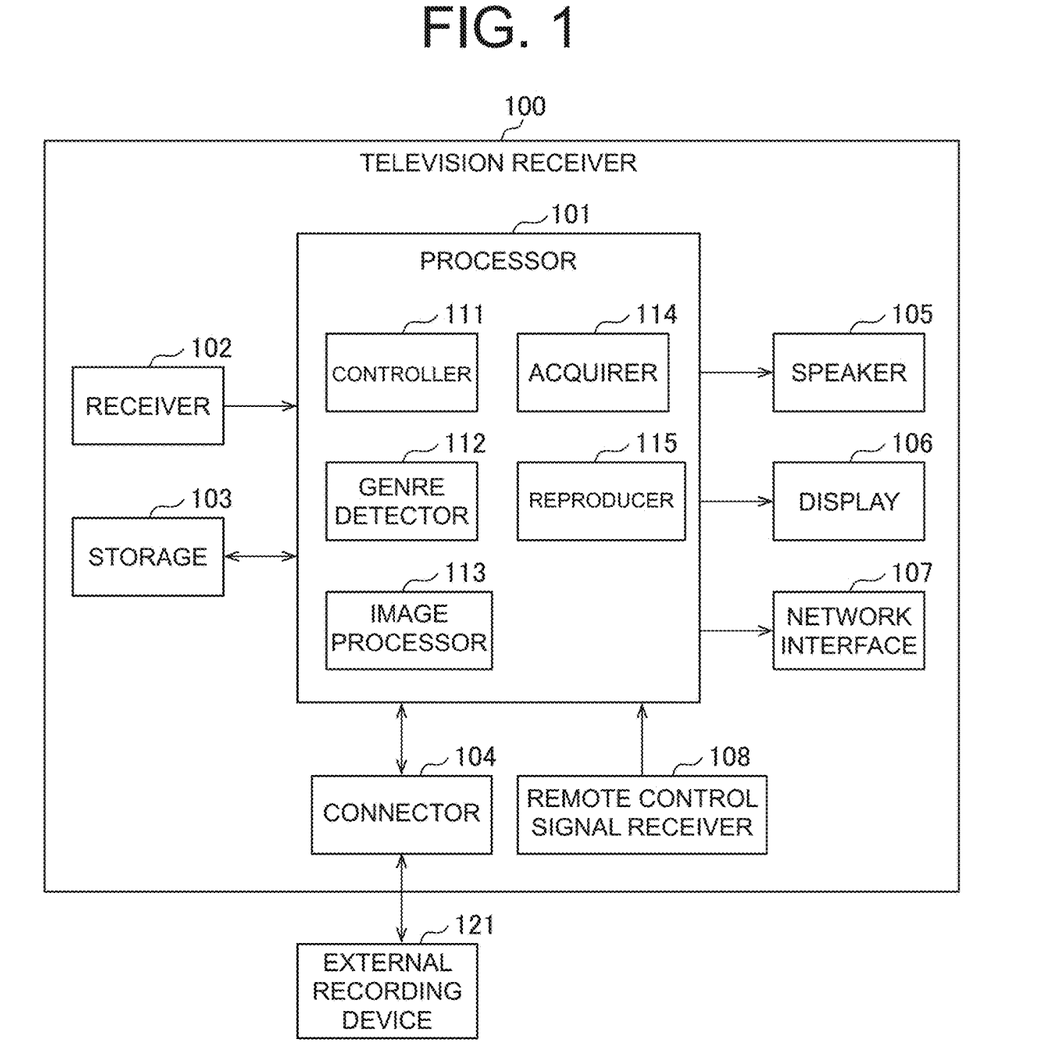
FIG. 1 is a diagram illustrating an example of a television receiver according to a first embodiment.

A first embodiment will be described hereinafter. FIG. 1 is a diagram illustrating an example of a television receiver 100 according to a first embodiment. The television receiver 100 (a display device) includes a processor 101, a receiver 102, a storage 103, a connector 104, a speaker 105, a display 106, a network interface 107, and a remote control signal receiver 108. The television receiver 100 may have other components, or some of the components in FIG. 1 may be omitted.

The processor 101 includes a controller 111, a genre detector 112, an image processor 113, an acquirer 114, and a reproducer 115. The processor 101 is a computer that executes various processes of various embodiments. The processor 101 includes a processor device and a memory. When the processor device of the processor 101 executes a plurality of instruction sets (programs) stored in the memory, various types of control of the embodiments may be realized. As the processor device, any processor device may be used, such as a CPU (Central Processing Unit), a GPU (Graphics Processing Unit), or an FPGA (Field Programmable Gate Array).

The programs described above are stored in a non-transitory recording medium, such as a semiconductor medium, an optical recording medium, or a magneto-optical recording medium. When the processor device of the processor 101 executes the programs stored in the recording medium, various types of control of the embodiments may be realized. The programs described above may also be obtained by the television receiver 100 from an external server through a network.

The receiver 102 includes, for example, a tuner. The receiver 102 receives broadcast waves delivered by broadcasting apparatuses of one or more broadcasters and performs prescribed signal processing. Such broadcast waves may include a plurality of programs distributed by the broadcasters. The receiver 102 receives broadcast waves in a wireless or wired manner. Furthermore, the broadcast waves are transmitted in terrestrial broadcasting (terrestrial digital television broadcasting) and satellite broadcasting. Examples of the satellite broadcasting include BS (Broadcasting Satellites) broadcasting, CS (Communication Satellites) broadcasting, and the new 4K8K satellite broadcasting.

The storage 103 stores various types of information. The storage 103 stores, for example, image quality parameters as image quality information associated with an image quality setting suitable for a video being displayed on the display 106. The storage 103 may store other information.

The connector 104 is connected to an external recording device 121. The external recording device 121 is a recording device that records data (program data) of a program received by the television receiver 100. The external recording device 121 is a USB (Universal Serial Bus) hard disk, a recorder, or the like.

The processor 101 can record program data received by the receiver 102 in the external recording device 121 via the connector 104. The processor 101 also reads program data recorded in the external recording device 121 via the connector 104 and reproduces the read program data. The external recording device 121 may be a recording device incorporated in the television receiver 100, for example.

The speaker 105 is a device that outputs audio. The display 106 is a device that displays images. Video of a program received by the receiver 102 is displayed on the display 106, and audio corresponding to the video is output from the speaker 105. The same applies when program data recorded in the external recording device 121 is reproduced.

The network interface 107 is connected to an external server via the Internet. The television receiver 100 can retrieve moving image data, for example, from the external server. The details will be described later.

The remote control signal receiver 108 receives a signal supplied from a remote controller used to operate the television receiver 100. The remote control signal receiver 108 outputs the received signal to the processor 101.

The controller 111 of the processor 101 performs various types of control in the embodiments. The genre detector 112 detects genre information and detects a change in genre information when the genre information is changed. The genre information will be described later in detail. The image processor 113 performs image processing on video data using an image quality setting (an image quality parameter) suitable for a video displayed on the display 106.

The acquirer 114 acquires from the storage 103 the image quality parameter suitable for the video displayed on the display 106. The reproducer 115 reads program data recorded in the external recording device 121 and reproduces the read program data.

Video data and genre information are multiplexed with each other in information about a program of a broadcast wave received by the receiver 102. The genre information indicates a genre of a program. Examples of the genre include sports, news, and drama.

The image processor 113 performs image processing on video data using image quality parameters of an image quality setting according to the video data of the program. The image quality parameters for suitable image processing vary depending on a program genre. For example, optimal image quality parameters when the genre is sports are different from optimal image quality parameters when the genre is news. However, the same image quality parameters may be used for different genres.

Figure 2:
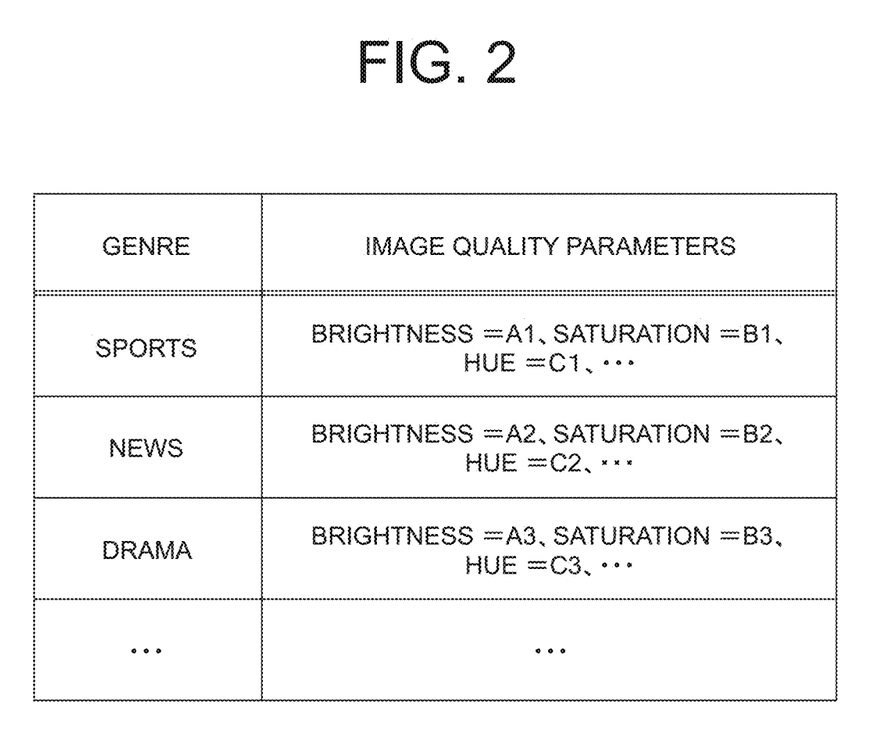
FIG. 2 is a table of an example of the correspondence relationships between genres and image quality parameters.

FIG. 2 is a table of an example of the correspondence relationships between genres and image quality parameters. For example, in the example in FIG. 2, when a genre is sports, image quality parameters used for image processing on video data are A1 for brightness, B1 for saturation, and C1 for hue.

When a genre corresponding to a video displayed on the display 106 is sports, the acquirer 114 reads the table example in FIG. 2 stored in the storage 103 to acquire the image quality parameters corresponding to the genre of sports. The image processor 113 performs image processing on video data using the acquired image quality parameters.

The same applies when a genre is news and when a genre is drama. The acquirer 114 acquires the image quality parameters corresponding to the genre information, and the image processor 113 performs the image processing on the video data using the acquired image quality parameters, so that a suitable image for the genre is displayed on the display 106.

Examples of genres and image quality parameters are not limited to the examples in FIG. 2. Movies, for example, may be employed as a genre. For example, contrast, sharpness, noise reduction, and the like may be employed as the image quality parameters.

A case where a program of the broadcast wave is switched will now be described. Video data and genre information of a program multiplexed into a broadcast wave received by the receiver 102 is not synchronized with each other. In addition, the genre information is transmitted in advance of the video data in the broadcast wave.

The genre detector 112 detects a genre of the program based on the genre information multiplexed in the broadcast wave received by the receiver 102. As described above, the genre information is transmitted in advance of the video data. Therefore, when switching between programs of different genres is performed, the genre detector 112 detects the change in program genre at a time before the video data is switched.

General television receivers change image quality parameters for image processing to be performed on video data at a timing when a change in genre is detected. In this case, even though a video displayed on the television receiver is from the previous program, video data of the video is subjected to the image processing using the image quality parameters of the next program. In this case, optimal image quality may not be attained due to the image processing using the image quality parameters that are not appropriate for the video data.

Figure 3A:
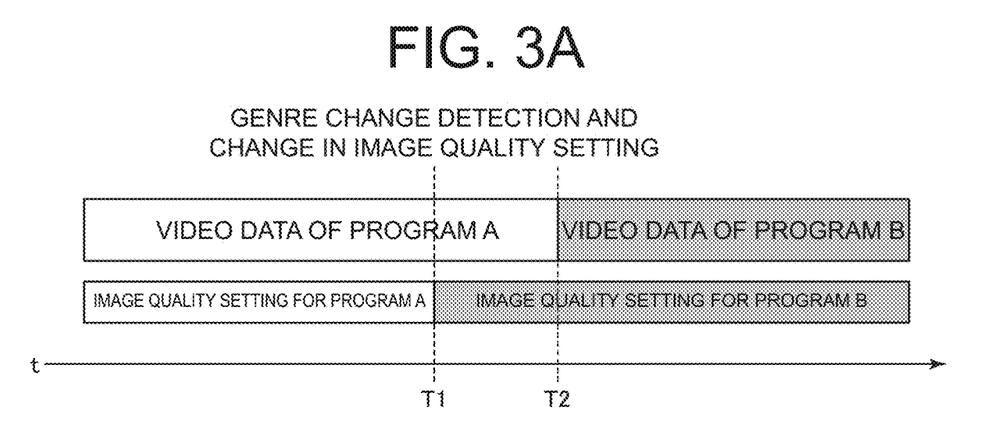
FIG. 3A is a diagram illustrating an example of a general change in an image quality setting.

FIG. 3A is a diagram illustrating an example of a general change in an image quality setting. Prior to a time point T1, a television receiver receives video data and genre information for a program A. It is assumed that a genre of the program A is sports and a genre of a program B is news.

At the time point T1 that comes before a time point T2 when the television receiver switches the video data of the program A to video data of the program B, the genre information received by the television receiver is switched from the genre information of the program A to genre information of the program B. As a result, the television receiver detects the change in genre information at the time point T1.

In the general television receiver, at the time point T1 when the change in genre information is detected, image quality parameters for image processing to be performed on the video data are changed from those for the program A to those for the program B.

In this case, even though a video displayed on the television receiver is of the program A, video data of the video is subjected to the image processing using the image quality parameters of the program B. In the example above, even though a video displayed in a period of time from the time point T1 to the time point T2 is of a program of the sports, video data of the video is subjected to the image processing using the image quality parameters for the news.

Therefore, in a period of time from the time point T1 to the time point T2, the video data is not subjected to optimal image processing, and the video displayed on the television receiver is not of optimal quality. This causes a user watching TV to feel uncomfortable with the image quality in the period of time from the time point T1 to the time point T2. As a result, the image quality is degraded in the period of time from the time point T1 to the time point T2.

Figure 3B:
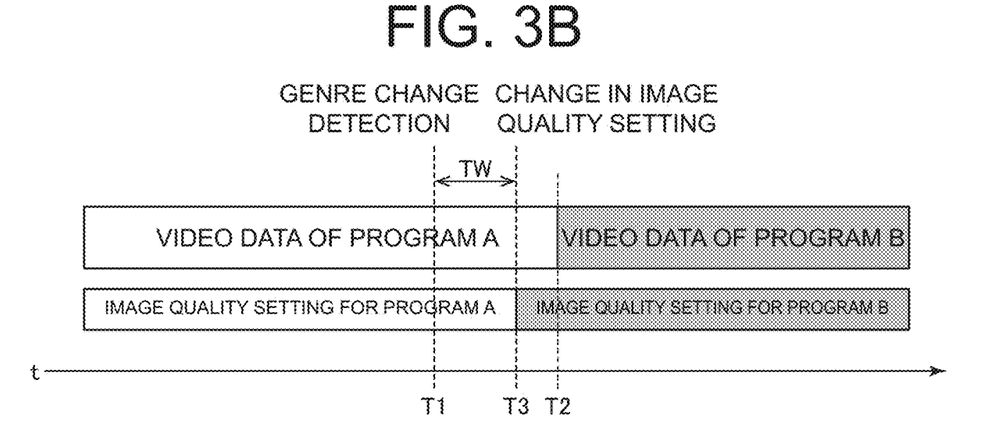
FIG. 3B is a diagram illustrating an example of a change in an image quality setting to which the first embodiment is applied.

FIG. 3B is a diagram illustrating an example of a change in an image quality setting to which the first embodiment is applied. Prior to a time point T1, the receiver 102 receives video data and genre information for a program A, and the display 106 displays the video data subjected to image processing using image quality parameters for the program A. At the time point T1, the genre information received by the receiver 102 is switched from genre information of the program A to that of a program B.

The genre detector 112 detects that the genre information has been changed at the time point T1. In this embodiment, the controller 111 does not change image quality parameters to be employed in the image processor 113 at a time when the change in genre information is detected, but performs control such that the image quality parameters being applied to the program A is maintained.

The controller 111 starts time counting from a time point when the genre detector 112 detects the change in genre information, and after a predetermined period of time TW has elapsed, changes the image quality parameters to be applied to the image processor 113 to the image quality parameters for the program B. The predetermined period of time TW will be described below.

Accordingly, a timing at which the image quality parameters for the image processing to be performed on the video data are changed when the genre information received by the receiver 102 of the television receiver 100 is changed may become closer to a timing at which the video data of the program is switched.

In the case of the example in FIG. 3B, in a period of time from the time point T1 and a time point T3, the controller 111 maintains the image quality parameters of the image processing performed by the image processor 113 at the image quality parameters for the program A, even though the genre detector 112 detects a change in genre. Here, the controller 111 may change image quality parameters to be applied to the same program depending on a scene. Video data of one program includes a plurality of scenes (frames), and the different scenes have different video feature values. The controller 111 analyzes the video feature values of the individual scenes included in the video data and changes the image quality parameters corresponding to the genre information of the program A in accordance with the video feature values of the individual scenes. In other words, a plurality of image quality parameters can be employed in a single program. The image quality parameters (image quality parameters of image processing to be performed on the video data of the program A) are changed according to the scenes, and therefore, image quality of the video data may be improved. This is also true for the other embodiments.

When the genre of the program A is sports and the genre of the program B is news, in a period from the time point T1 to the time point T3, under the control of controller 111, the image processor 113 performs the image processing on the video data of the sports program using the image quality parameters for sports.

Accordingly, degradation of image quality of the video displayed on the display 106 is suppressed until the time point T3. In other words, a period of time in which the image quality is degraded owing to the change in genre information is reduced.

Here, the controller 111 may read the image quality parameters for the program B from the storage 103 in advance of the time point T3 (the time point when the predetermined period of time TW has elapsed after the change in genre information is detected). By this, the image processor 113 can promptly perform the image processing using the image quality parameters for the program B on the video data at the time point T3. Note that the controller 111 may read the image quality parameters for the program B from the storage 103 at the time point T3.

The predetermined period of time TW will now be described. Genre information in a broadcast wave is transmitted from a broadcasting apparatus of a broadcaster at a predetermined retransmission interval. For example, genre information is transmitted at a predetermined transmission interval by means of packets referred to as EIT (Event Information Table).

For example, according to an operational standard of ARIB (Association of Radio Industries and Businesses), transmission intervals of EIT packets are prescribed in broadcast waves of a digital terrestrial television broadcasting, BS broadcasting, and CS broadcasting, individually. For example, a default value for the digital terrestrial television broadcasting is 1 second (1 second at minimum and 3 seconds at maximum). A default value for the BS broadcasting is 3 seconds (1 second at minimum and 3 seconds at maximum). A default value for the CS broadcasting is 1 second (1 second at minimum and 3 seconds at maximum).

The controller 111 sets the above predetermined period of time TW as the transmission interval for the EIT packets. The controller 111 may change the setting of the predetermined period of time TW according to a type of broadcast wave of a video displayed on the display 106.

When a video of the digital terrestrial television broadcasting or the CS broadcasting is displayed on the display 106, the controller 111 sets the predetermined period of time TW to 1 second. When a video of the BS broadcasting is displayed on the display 106, the controller 111 sets the predetermined period of time TW to 3 seconds.

As described above, the predetermined period of time TW may be set according to the transmission interval of EIT packets in the broadcast wave of the video displayed on the display 106. The predetermined period of time TW may be set based on any criterion other than EIT packets.

Figure 4:
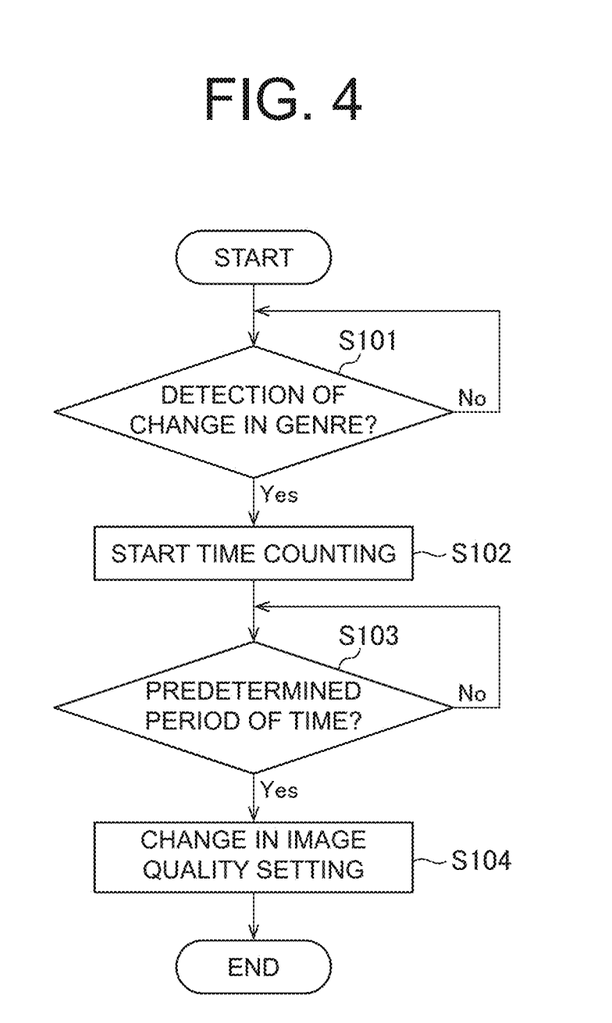
FIG. 4 is a flowchart of an example of a process according to the first embodiment.

FIG. 4 is a flowchart of an example of a process according to the first embodiment. The flowchart in FIG. 4 is executed when video data of a program of a broadcast wave received by the receiver 102 is displayed on the display 106.

The controller 111 determines whether the genre detector 112 has detected a change in genre information received by the receiver 102 (step S101). When the genre detector 112 has not detected the change in genre information, the controller 111 obtains a negative determination result in step S101 and returns to step S101. In this case, processing after step S102 is not performed until the genre detector 112 detects a change in genre information.

When the genre detector 112 has detected a change in genre information, the controller 111 obtains a positive determination result in step S101 and proceeds to step S102. The controller 111 starts time counting (step S102). The controller 111 may perform time counting using a software timer or a hardware timer. Before the process in step S102 is executed, a counting time is at its initial value (zero).

The controller 111 determines whether the predetermined period of time TW has elapsed from start of the counting (step S103). When the predetermined period of time TW has not elapsed, the controller 111 obtains a negative determination result in step S103 and returns to step S103. In this case, the controller 111 maintains a setting of image quality parameters of the image processor 113 without changing them. Note that, as described above, the image quality parameters employed in a single program may vary depending on a scene.

When the predetermined period of time TW has elapsed after the start of the counting, the controller 111 obtains a positive determination result in step S103 and proceeds to step S104. The controller 111 changes the image quality parameters employed in the image processor 113 to image quality parameters of a genre of a next program (the program B) obtained by the acquirer 114 (step S104). After the process in step S104, the controller 111 terminates the flowchart in FIG. 4.

As described above, in this embodiment, the controller 111 performs the image processing using the image quality parameters for the genre of the changed program, instead of a time point the genre change is detected, after the predetermined period of time TW has elapsed from the time point when the genre change is detected. Accordingly, a period of time in which image quality is degraded due to image processing performed using image quality parameters for genre information of a next program on video data of a program being displayed may be reduced.

Second Embodiment

Next, a second embodiment will be described. In the second embodiment, a controller 111 controls an image processor 113 so that the image processor 113 performs a smoothing process from a time point T3 which comes after a predetermined period of time TW has elapsed from a time point T1 when a change in genre information is detected.

Figure 5:
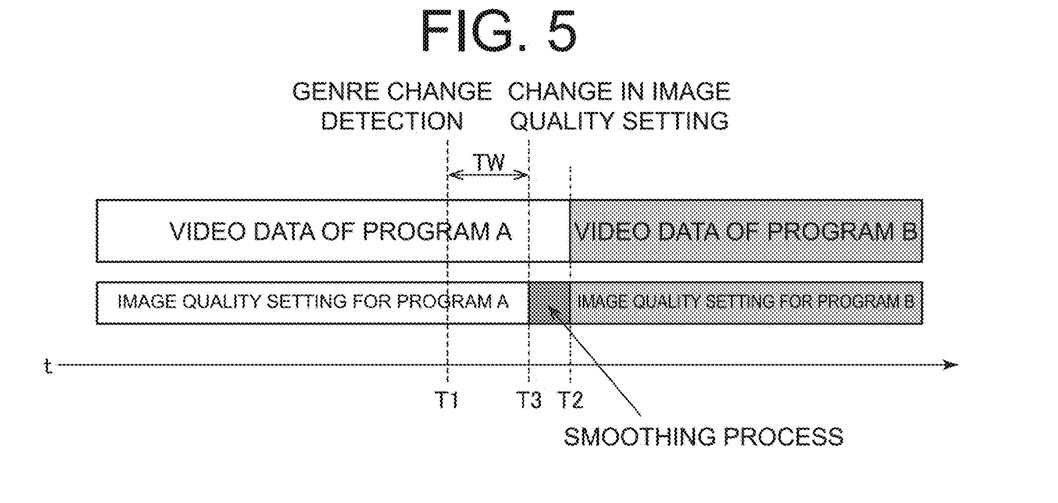
FIG. 5 is a diagram illustrating an example of a change in an image quality setting to which a second embodiment is applied.

The smoothing process is a process of changing image quality in stages. FIG. 5 is a diagram illustrating an example of a change in an image quality setting to which the second embodiment is applied. In the first embodiment, the controller 111 changes the image quality parameters of the program A employed in the image processor 113 to those of the next program B at the time point T3.

In the second embodiment, the controller 111 acquires video feature values of video data at a time point T3 and changes image quality parameters in stages to image quality parameters for genre information of a next program B, starting from image quality parameters corresponding to the video feature values.

The controller 111 may change image quality parameters applied to the same program depending on a scene. For example, in the example in FIG. 5, the controller 111 performs control such that image processing is performed using image quality parameters for a program A until the time point T3.

On the other hand, video data of the program A includes a plurality of scenes (frames), and the different scenes have different video feature values. The controller 111 analyzes the video feature values of the individual scenes included in the video data and changes the image quality parameters corresponding to genre information of the program A in accordance with the video feature values of the individual scenes. The image quality parameters (image quality parameters of image processing to be performed on the video data of the program A) are changed according to the scenes, and therefore, image quality of the video data may be improved. This is also true for the other embodiments.

When changing the image quality parameters, the controller 111 sets an image quality parameter corresponding to a video feature value of a scene in the video data of the program A, instead of at the time point T1, at the time point T3 which comes when a predetermined period of time TW has elapsed after a time point T1. Then the controller 111 performs a process (a smoothing process) of changing the image quality parameters in stages to the image quality parameters for the next program B, starting from the image quality parameter employed at the time point T3.

Any method, such as linear interpolation, can be employed as the smoothing process. The controller 111 may keep a degree of the change in stages of the image quality parameters constant or different when the smoothing process is performed. For example, the controller 111 may gradually increase the degree of the change in the image quality parameters from the time point T3 to a time point T2.

Figure 6:
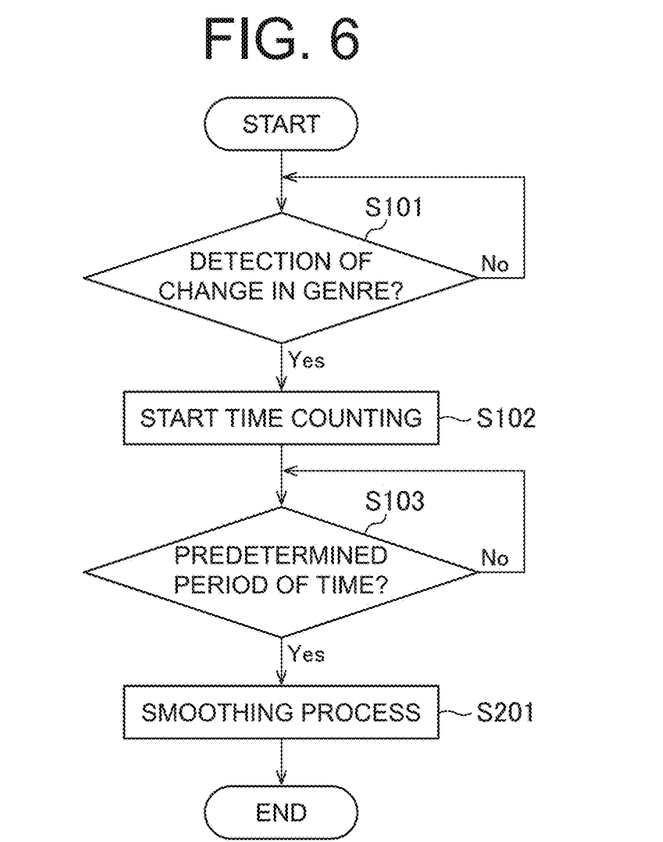
FIG. 6 is a flowchart of an example of a process according to the second embodiment.

FIG. 6 is a flowchart of an example of the process according to the second embodiment. Since individual processes from step S101 to step S103 are the same as those in the first embodiment, descriptions thereof are omitted. When determining that the predetermined period of time TW has elapsed after a start of time counting, the controller 111 proceeds to step S201.

The controller 111 performs the smoothing process described above (step S201). In this way, the image quality parameters employed in the image processor 113 are changed in stages after the predetermined period of time TW has elapsed since the genre change is detected. After the process in step S201, the controller 111 terminates the flowchart in FIG. 6.

As described above, in this embodiment, the controller 111 performs the smoothing process of gradually changing the image quality parameters that are employed at the time point T3 when the predetermined period of time TW has elapsed after the change in genre information is detected to the image quality parameters of the next program.

As a result, the image quality parameters employed in the image processor 113 when the image processor 113 performs the image processing on the image data are changed in stages, and therefore, image quality of the video data is also changed in stages. Compared to the case where the image quality parameters employed in the image processor 113 are immediately changed, the discomfort caused to the user can be reduced.

Third Embodiment

Next, a third embodiment will be described. As described above, EIT packets of genre information are delivered by a broadcaster at a retransmission interval corresponding to a broadcast wave. Here, for example, when a reception state of EIT packets is unstable due to noise or the like, the EIT packets may be processed at an interval shorter than the retransmission interval.

In this case, a receiver 102 receives new genre information before a predetermined period of time TW has elapsed after genre information is received. In this case, a detection of a change in genre information is more frequently performed, and a change in an image quality setting may frequently occur. As a result, for example, a video displayed on a display 106 may flicker.

In the third embodiment, when a controller 111 detects a new change in genre information before the predetermined period of time TW elapses after a genre detector 112 detects a change in genre information, a time counting criterion for the predetermined period of time TW is set to a time point when the new change in genre information is detected.

Figure 7:
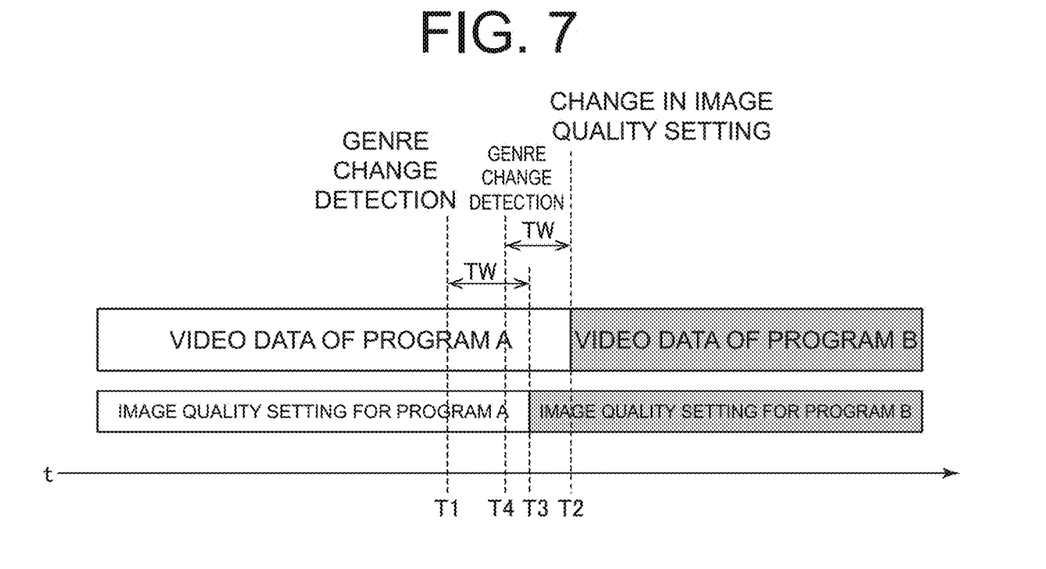
FIG. 7 is a diagram illustrating an example of a change in an image quality setting to which a third embodiment is applied.

FIG. 7 is a diagram illustrating an example of a change in an image quality setting to which the third embodiment is applied. At a time point T1, the genre detector 112 detects a change in genre information. The controller 111 does not change image quality parameters employed in an image processor 113 until the predetermined period of time TW has elapsed after starting of the time counting.

It is assumed that, at a time point T4 before the time point T3 which comes when the elapse of the predetermined period of time TW from the time point T1, the genre detector 112 detects a new change in genre information. In this case, the controller 111 initializes the counting time.

By this, the controller 111 changes image quality parameters to be employed in the image processor 113 to image quality parameters for a program B at a time point T2 when the predetermined period of time TW has elapsed since the time point T4 when the genre detector 112 has detected the new change in genre information. When the genre detector 112 again detects a change in genre information before the time point T2, the controller 111 initializes the counting time.

When a reception state of EIT packets is unstable and a new change in genre is detected before the predetermined period of time TW has elapsed since the genre detector 112 detected the change in genre information, the counting of the predetermined period of time TW is initialized. Therefore, the image quality setting is not changed at the time point T3, but is changed at the time point T2. As a result, even when the reception state of EIT packets is unstable, frequent changes in the image quality setting are suppressed.

Figure 8:
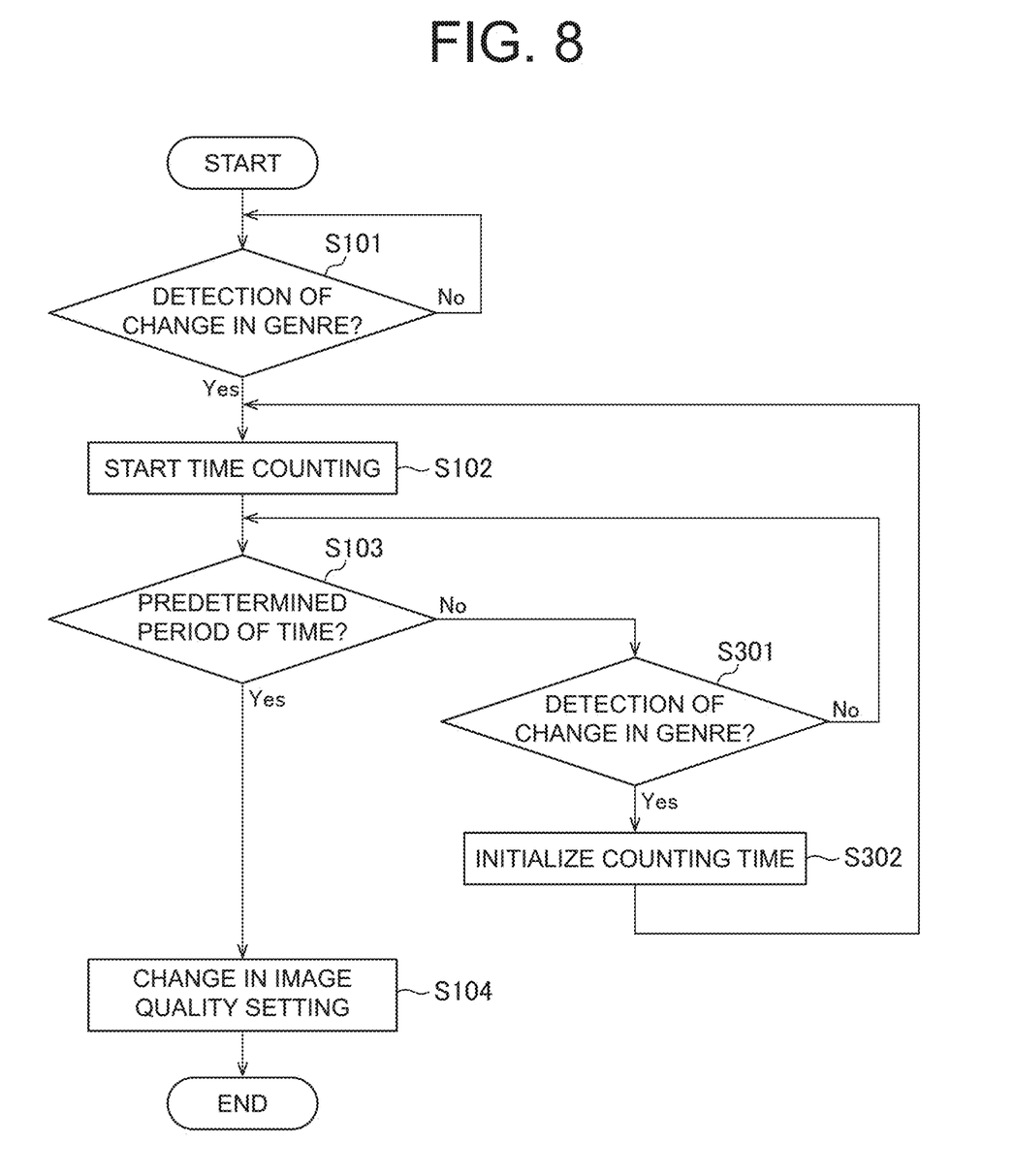
FIG. 8 is a flowchart of an example of a process according to the third embodiment.

FIG. 8 is a flowchart of an example of the process according to the third embodiment. Since individual processes from step S101 to step S104 are the same as those in the first embodiment, descriptions thereof are omitted. When determining that the predetermined period of time TW has not elapsed after a start of time counting in step S103, the controller 111 proceeds to step S301.

The controller 111 determines whether the genre detector 112 has detected a change in genre information (step S301). When the genre detector 112 has not detected a change in genre information, the controller 111 obtains a negative determination result in step S301 and returns to step S103. In this case, the determination in step S103 and the determination in step S301 are performed again.

When the genre detector 112 has detected a change in genre information, the controller 111 obtains a positive determination result in step S301 and proceeds to step S302. In this case, the change in genre information is detected before the predetermined period of time TW has elapsed since the start of the time counting. The controller 111 initializes the counting time (step S302).

After step S302, the controller 111 returns to step S102. The controller 111 starts the time counting in the state in which the counting time is initialized. As a result, the image quality setting is changed at the time point T2 instead of the time point T3 in the example of FIG. 7.

As described above, in the third embodiment, when the controller 111 detects a new change in genre information before the predetermined period of time TW has elapsed after the genre detector 112 detects a change in genre information, the counting time is initialized.

Thereafter, the controller 111 changes the image quality parameters employed in the image processor 113 to image quality parameters for a next program when the predetermined period of time TW has elapsed since a time point when a new change in genre information is detected. However, when detecting a change in genre information again before the predetermined period of time TW has elapsed after the new change in genre information is detected, the controller 111 initializes the counting time.

As a result, frequent changes in image quality setting caused by an unstable reception state of EIT packets are suppressed.

Fourth Embodiment

Next, a fourth embodiment will be described. Program data of a broadcast wave received by a receiver 102 can be recorded on an external recording device 121. For example, when a user operates a remote controller to issue a recording instruction, a remote control signal receiver 108 receives the recording instruction from the remote controller. In response to the recording instruction, a controller 111 records program data in the external recording device 121. When a function, such as reserved recording, is used, the controller 111 records specified program data at a specified time in the external recording device 121.

The program data is recorded in the external recording device 121 in a format known as partial TS (Transport Stream), for example. The partial TS is a group of packets constituted by packets required for reproduction of program data selected from among TS packets of a normal broadcast wave.

The program data recorded on the external recording device 121 in the form of the partial TS also includes genre information in the same way as the broadcast wave received by the receiver 102. The genre information is not synchronized with video data of the program data. Furthermore, a timing of a change in genre information precedes a timing of switching of video data. Therefore, when image quality parameters are changed to those of a next program at the timing when the change in genre information is detected, the problem described above occurs.

It is assumed that a user operates a remote controller to reproduce program data recorded on the external recording device 121. The remote controller transmits an instruction for reproducing the specified program data. The remote control signal receiver 108 receives the reproduction instruction. The remote control signal receiver 108 outputs the received reproduction instruction to a processor 101.

A reproducer 115 reads the specified program data from the external recording device 121 via a connector 104 in response to the reproduction instruction. In this case, the connector 104 functions as a receiver. The reproducer 115 then controls reproduction of the read program data. The reproducer 115 causes a display 106 to display a video of the program data and a speaker 105 to output audio of the program data.

While the reproducer 115 controls the reproduction of the program data, the controller 111 performs the control according to the first embodiment described above. Specifically, the controller 111 performs the various processes in the flowchart in FIG. 4.

As described above, the program data recorded on the external recording device 121 includes video data and genre information. Furthermore, the video data is not synchronized with the genre information. Therefore, the controller 111 determines whether the genre detector 112 has detected a change in genre information while the reproducer 115 reproduces the program data.

When a change in genre information is detected, the controller 111 starts time counting. The controller 111 does not change image quality parameters until a predetermined period of time TW has elapsed after the change in genre information is detected. The controller 111 changes the image quality parameters employed in an image processor 113 to image quality parameters for a next program when the predetermined period of time TW has elapsed after the change in genre information is detected.

As described above, the same effect as in the first embodiment can be obtained when program data recorded on the external recording device 121 is reproduced. The fourth embodiment may be applied to the second and third embodiments.

Fifth Embodiment

Next, a fifth embodiment will be described. A broadcast wave received by a receiver 102 includes program information about a program. A controller 111 generates an electronic programming guide (EPG) based on the program information received by the receiver 102. The electronic program guide is generated by arranging programs in chronological order by channel (broadcaster). For example, the electronic programming guide includes information on individual programs distributed by individual broadcasters on a weekly basis.

The electronic programming guide includes information on time points when the individual programs start and lengths of the programs. The controller 111 stores electronic programming guide in a storage 103, for example. The electronic programming guide may be obtained from an external server using a network interface 107 through the Internet.

Here, the controller 111 may set the predetermined period of time TW described in the first embodiment based on the electronic programming guide. The electronic programming guide includes information on start time points and program lengths as described above. The controller 111 sets the predetermined period of time TW based on the time points when the individual programs in the electronic programming guide start. Note that, when the electronic programming guide includes information on end times of the programs, the controller 111 may set the predetermined period of time TW based on the end times of the programs included in the electronic programming guide.

For example, in the example in FIG. 3B, the controller 111 sets the predetermined period of time TW to be a period of time from a time point T1 when a change in genre information is detected to a time point T2. At the time point T2, video data of a program A is switched to video data of a program B, and therefore, the time point T2 can be recognized with reference to a time point when a program starts in the electronic programming guide.

Accordingly, the controller 111 can match a time point when image quality parameters to be employed in an image processor 113 are changed with a time point when video data is switched. In this case, image processing using image quality parameters for genre information of a next program is not performed on video data of a program being displayed, and therefore, image quality is not degraded.

Here, the programming guide data is different from genre information multiplexed in a broadcast wave. When the predetermined period of time TW is set based on the programming guide data, the controller 111 executes a predetermined application to read and decode the programming guide data stored in the storage 103, for example.

Therefore, the controller 111 is required to perform image processing on video data and a process associated with the programming guide data in real time based on a broadcast wave received by the receiver 102, and accordingly, processing efficiency is degraded. In other words, when the controller 111 performs the various processes described above, it is more efficient to perform the processes in real time based on the genre information included in the distributed programming guide data than the processes using the programming guide data.

Therefore, a setting of a process using the programming guide data or a setting of a process without the programming guide data may be selected, for example. For example, the user may select one of the above settings on a television receiver 100 using a remote controller. Furthermore, when the television receiver 100 is shipped, the process using the programming guide data or the process without the programming guide data may be set. When the programming guide data is not used, an interval between EIT packet transmissions described in the first embodiment is set as the predetermined period of time TW.

As described above, according to the fifth embodiment, since the controller 111 sets the predetermined period of time TW using the programming guide data, the image processing using image quality parameters of genre information for a next program is not performed on video data of a program being displayed, and therefore, image quality is not degraded. The fifth embodiment may be applied to the fourth embodiment.

Sixth Embodiment

Figure 9:
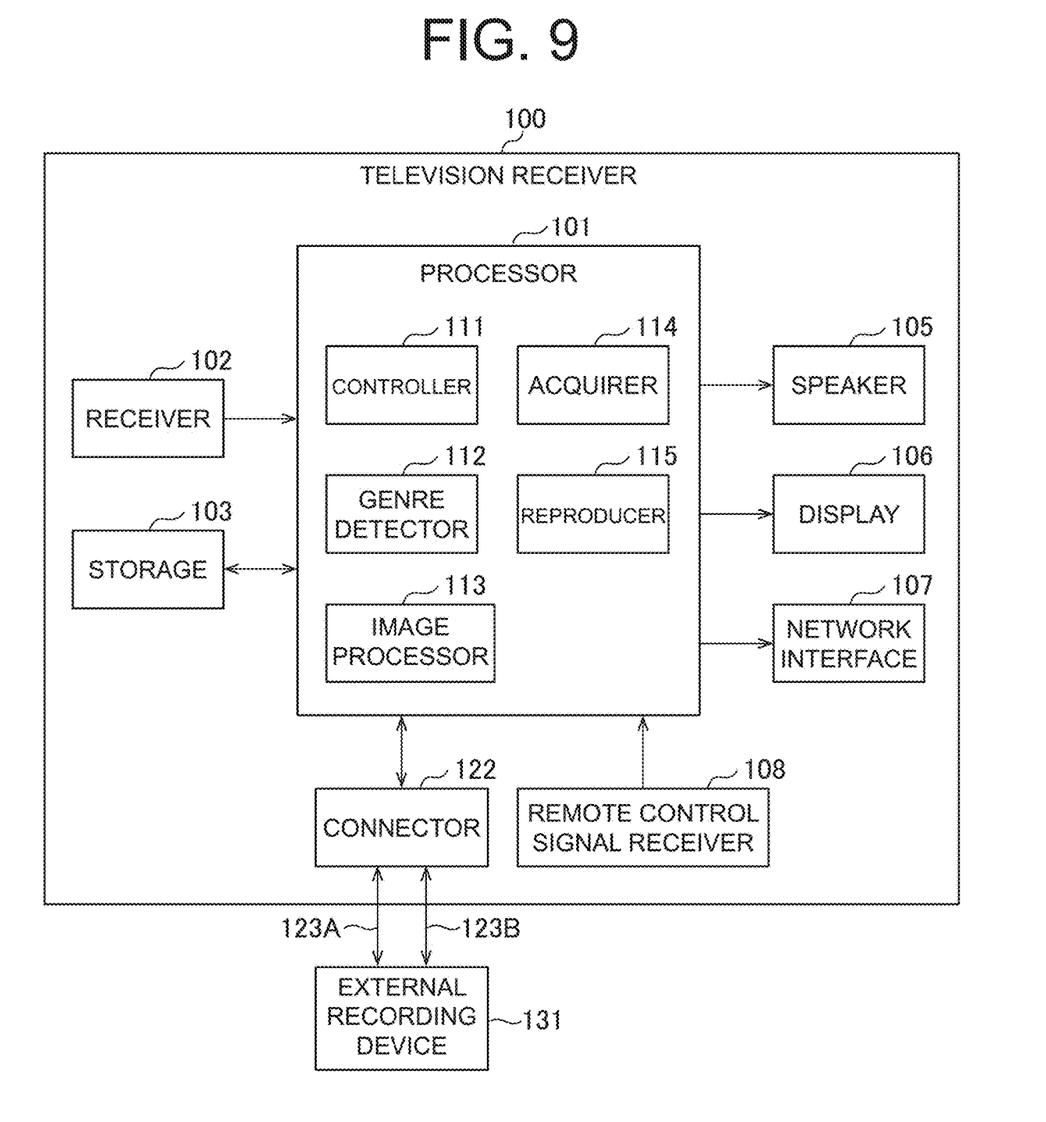
FIG. 9 is a diagram illustrating an example of a television receiver according to a sixth embodiment.

Next, a sixth embodiment will be described. FIG. 9 is a diagram illustrating an example of a television receiver 100 according to a sixth embodiment. In the example in FIG. 9, an external recording device 131 is connected to the television receiver 100. The external recording device 131 in the example of FIG. 9 is different from the external recording device 121 in the example of FIG. 1.

The external recording device 131 in the example of FIG. 9 is a recorder capable of performing writing and reading on optical discs, such as a Blu-ray (registered trademark) recorder. The external recording device 131 and a connector 122 of the television receiver 100 are connected to each other by an HDMI (registered trademark) (High-Definition Multimedia Interface) cable, for example. Therefore, both the television receiver 100 and the external recording device 131 are HDMI-compatible devices.

The HDMI cable includes an AV signal transmission path 123A and a CEC (Consumer Electronics Control) signal transmission path 123B. The AV signal transmission path 123A is a first transmission path for transmitting video data and audio data. The CEC signal transmission path 123B is a second transmission path of a single-line serial defined in the HDMI-CEC standard. The television receiver 100 and the external recording device 131 may perform EDID (Extended Display Identification Data) aware communication with each other through the CEC signal transmission path 123B.

The controller 111 of the television receiver 100 performs control such that program data of a broadcast wave received by a receiver 102 is recorded on the external recording device 131 through the HDMI cable. By this, the program data of the broadcast wave received by the television receiver 100 is recorded on the external recording device 131.

In the sixth embodiment, as in the fourth embodiment, a reproducer 115 reads program data recorded on the external recording device 131 via a connector 122. In this case, the connector 122 functions as a receiver. The reproducer 115 controls reproduction of the program data. In the sixth embodiment, video data is transmitted via the AV signal transmission path 123A, and genre information is transmitted via the CEC signal transmission path 123B. The video data is not synchronized with the genre information.

Therefore, in the sixth embodiment, the same process as in the first embodiment is performed. When a change in genre information is detected, the controller 111 starts time counting. The controller 111 does not change image quality parameters until a predetermined period of time TW has elapsed after the change in genre information is detected. The controller 111 changes the image quality parameters employed in an image processor 113 to image quality parameters for a next program when the predetermined period of time TW has elapsed after the change in genre information is detected.

As described above, the same effect as in the first embodiment can be obtained when the program data recorded on the external recording device 131 is reproduced through the HDMI cable. The sixth embodiment may be applied to the second and third embodiments.

Modifications

According to the fourth embodiment described above, program data of a broadcast wave received by the receiver 102 of the television receiver 100 is recorded on the external recording device 121. When the reproducer 115 reproduces program data recorded on the external recording device 121, the controller 111 performs the various processes described in the fourth embodiment.

For example, the fourth embodiment is also applicable when the program data recorded on the external recording device 121 is not program data of a broadcast wave but moving image data (content). The content is provided by an external server, for example, connected via the Internet. For example, the television receiver 100 obtains the content from the network interface 107 via the Internet, and the obtained content is recorded on the external recording device 121. Alternatively, the content may be recorded on the external recording device 121, for example, via a personal computer, without using the television receiver 100.

The content may include a plurality of moving image data. In this case, genre information may be included in the content for each moving image data. Furthermore, there may be a case where individual video data and corresponding genre information of moving image data are not synchronized with each other.

In such a case, when the reproducer 115 reproduces the plurality of moving image data included in the content, the controller 111 performs the various processes of the fourth embodiment so that the same effects as in the fourth embodiment are obtained. The same effects as in the sixth embodiment can be obtained by the controller 111 performing the various processes of the sixth embodiment even when the content is recorded on the external recording device 131 that is connected to the television receiver 100 via HDMI as in the sixth embodiment.

Furthermore, the content may be distributed by an external server, for example. For example, the television receiver 100 is connected using the network interface 107 to an external server via the Internet. The television receiver 100 can perform streaming reproduction of content distributed by the external server.

When the content subjected to the streaming reproduction includes a plurality of moving image data and genre information is associated with the individual moving image data, the controller 111 can perform the various processes of the fourth or sixth embodiment described above. The content is obtained from the external server, instead of the external recording device 121 or the external recording device 131. In this case, the network interface 107 functions as a receiver.

The present disclosure is not limited to each of the above-described embodiments, and various modifications may be made thereto within the scope indicated by the claims. An embodiment that can be implemented by appropriately combining technical sections disclosed in the different embodiments also falls within the technical scope of the present disclosure. Furthermore, new technical features can be created by combining the technical sections disclosed in the embodiments. The order of the processes in the flowcharts described in the embodiments described above can be interchanged as much as possible.

The programs that realize the functions of the embodiments are stored in a non-transitory recording medium, such as a semiconductor medium, an optical recording medium, or a magneto-optical recording medium. For example, a non-volatile memory card or the like may be used as the semiconductor medium. A CD (Compact Dick) or a DVD (Digital Versatile Disk) may be used as the optical recording medium and the magneto-optical recording medium. Furthermore, the above program may be supplied to a computer via any transmission medium capable of performing transmission.

What is claimed is:

1. A display device comprising:
    a receiver that receives at least video data and genre information;
    an acquirer that acquires image quality information corresponding to the genre information;
    a genre detector that detects a change in the genre information; and
    a controller that performs, when the change in the genre information is detected, control such that image quality of the video data is set based on image quality information corresponding to the changed genre information when a predetermined period of time has elapsed after a point of time at which the genre information is changed,
    wherein the predetermined period of time is a transmission interval of the genre information prescribed in a broadcast wave, and
    the controller changes the predetermined period of time in accordance with a type of the broadcast wave.

2. The display device according to claim 1, wherein the controller changes, in stages, image quality information corresponding to video feature values of scenes of the video data, at a point of time at which the predetermined period of time has elapsed, to the image quality information corresponding to the changed genre information.

3. The display device according to claim 1, wherein, when a new change in genre information is detected before the predetermined period of time has elapsed and after the genre detector detects the change in the genre information, the controller performs control such that the image quality of the video data is set based on image quality information corresponding to the new changed genre information when the predetermined period of time has elapsed after a point of time at which the new change in genre information is detected.

4. The display device according to claim 1, further comprising:
    a reproducer that reads and reproduces recording data from a recording device that records the recording data of a program including the received video data and the received genre information, wherein when a change in the genre information of the recording data being reproduced is detected, the controller performs control such that image quality of the video data of the recording data is set based on image quality information corresponding to the changed genre information when the predetermined period of time has elapsed after a point of time at which the genre information of the recording data is changed.

5. The display device according to claim 1, wherein the predetermined period of time is set based on a programming guide acquired by the display device.

6. The display device according to claim 1, further comprising:
a reproducer that
reads, from a recording device that records recording data of a program including the video data and the genre information, the video data being out of the recording data through a first transmission path,
reads the genre information in the recording data through a second transmission path that is different from the first transmission path, and
reproduces the recording data, wherein
when a change in the genre information of the recording data being reproduced is detected, the controller performs control such that image quality of the video data of the recording data is set based on image quality information corresponding to the changed genre information when the predetermined period of time has elapsed after a point of time at which the genre information of the recording data is changed.

7. A display control method performed by at least one processor, the display control method comprising:
receiving at least video data and genre information;
acquiring image quality information corresponding to the genre information;
detecting a change in the genre information;
performing, when the change in the genre information is detected, control such that image quality of the video data is set based on image quality information corresponding to the changed genre information when a predetermined period of time has elapsed after a point of time at which the genre information is changed,
wherein the predetermined period of time is a transmission interval of the genre information prescribed in a broadcast wave; and
changing the predetermined period of time in accordance with a type of the broadcast wave.

8. A non-transitory computer-readable medium coupled to at least one processor and storing one or more instructions which, when executed by the at least one processor, cause the at least one processor to:
receive at least video data and genre information;
acquire image quality information corresponding to the genre information;
detect a change in the genre information;
perform, when the change in the genre information is detected, control such that image quality of the video data is set based on image quality information corresponding to the changed genre information when a predetermined period of time has elapsed after a point of time at which the genre information is changed,
wherein the predetermined period of time is a transmission interval of the genre information prescribed in a broadcast wave; and
change the predetermined period of time in accordance with a type of the broadcast wave.

* * * * *